(12) United States Patent
Nakashima et al.

(10) Patent No.: US 8,876,155 B2
(45) Date of Patent: Nov. 4, 2014

(54) CURTAIN AIRBAG DEVICE FOR VEHICLE

(75) Inventors: Atsushi Nakashima, Yokohama (JP); Tetsuya Matsushita, Yokohama (JP)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 14/111,839

(22) PCT Filed: Apr. 12, 2012

(86) PCT No.: PCT/JP2012/059981
§ 371 (c)(1),
(2), (4) Date: Oct. 15, 2013

(87) PCT Pub. No.: WO2012/144404
PCT Pub. Date: Oct. 26, 2012

(65) Prior Publication Data
US 2014/0035265 A1 Feb. 6, 2014

(30) Foreign Application Priority Data

Apr. 20, 2011 (JP) ................................. 2011-094182

(51) Int. Cl.
*B60R 21/213* (2011.01)
*B60R 21/232* (2011.01)
*B60R 21/2338* (2011.01)
*B60R 21/231* (2011.01)
*B60R 21/201* (2011.01)

(52) U.S. Cl.
CPC ......... *B60R 21/201* (2013.01); *B60R 21/23138* (2013.01); *B60R 21/232* (2013.01); *B60R 21/2338* (2013.01); *B60R 21/213* (2013.01); *B60R 2021/23386* (2013.01)
USPC ...................... 280/730.2; 280/729; 280/743.2

(58) Field of Classification Search
CPC  B60R 21/213; B60R 21/232; B60R 21/2338; B60R 2021/23316; B60R 2021/23386
USPC .................... 280/729, 730.2, 743.2
See application file for complete search history.

(56) References Cited

U.S. PATENT DOCUMENTS 6,010,149 A * 1/2000 Riedel et al. ................ 280/730.2
6,168,191 B1 * 1/2001 Webber et al. ............. 280/730.2
(Continued)

FOREIGN PATENT DOCUMENTS

GB  2312877 A * 11/1997 .............. B60R 21/16
GB  2339557 A *  2/2000 .............. B60R 21/16
(Continued)

OTHER PUBLICATIONS

International Search Report of PCT/JP2012/059981, Mailed Jul. 3, 2012, 2 pages.

*Primary Examiner* — Ruth Ilan
*Assistant Examiner* — Laura Freedman
(74) *Attorney, Agent, or Firm* — Brinks Gilson & Lione

(57) ABSTRACT

A vehicle curtain airbag device capable of improving an occupant ejection preventing performance at an end of a vehicle in the longitudinal direction and providing an excellent impact absorbing function when receiving an occupant in a vehicle interior. A front strap is provided between a seam portion that divides a front chamber positioned at an end of a vehicle longitudinal direction from an adjacent main chamber, and a front pillar positioned at the end of the vehicle longitudinal direction so as to connect the seam portion to the front pillar, on an outer surface of the front chamber. A height position of a first connecting portion (P) between the front pillar and the front strap is set to be higher than a height position of a second connecting portion (Q) between the seam portion and the front strap. The front strap is set to be shorter than a length between the first connecting portion and a position to which the second connecting portion tries to move according to the inflation and deployment if the front strap is not present, and is stretched substantially linearly between the first and second connecting portions by the inflated and deployed front chamber.

10 Claims, 7 Drawing Sheets

(56) References Cited

U.S. PATENT DOCUMENTS

| | | | |
|---|---|---|---|
| 6,312,010 B1 * | 11/2001 | Heigl | 280/730.2 |
| 6,318,753 B1 * | 11/2001 | Valkenburg | 280/730.2 |
| 6,367,836 B1 * | 4/2002 | Tanase et al. | 280/730.2 |
| 6,450,529 B1 * | 9/2002 | Kalandek et al. | 280/730.2 |
| 6,454,296 B1 * | 9/2002 | Tesch et al. | 280/730.2 |
| 6,454,298 B1 * | 9/2002 | Hardig et al. | 280/730.2 |
| 6,695,342 B2 * | 2/2004 | Tanase et al. | 280/730.2 |
| 6,695,347 B2 * | 2/2004 | Sonnenberg et al. | 280/743.2 |
| 6,705,636 B2 * | 3/2004 | Takahara | 280/728.2 |
| 6,709,008 B2 * | 3/2004 | McGee et al. | 280/729 |
| 6,709,010 B2 * | 3/2004 | Dominissini et al. | 280/730.2 |
| 6,758,490 B2 * | 7/2004 | Hoeft et al. | 280/730.2 |
| 6,830,262 B2 * | 12/2004 | Sonnenberg et al. | 280/730.2 |
| 6,848,708 B2 * | 2/2005 | Green et al. | 280/729 |
| 6,991,255 B2 * | 1/2006 | Henderson et al. | 280/730.2 |
| 7,125,038 B2 * | 10/2006 | Gammill | 280/728.2 |
| 7,658,401 B2 * | 2/2010 | Valdez et al. | 280/730.2 |
| 7,712,768 B2 * | 5/2010 | Fukuda et al. | 280/729 |
| 7,823,922 B2 * | 11/2010 | Mitchell et al. | 280/743.2 |
| 8,006,998 B2 * | 8/2011 | Hatfield et al. | 280/730.2 |
| 8,505,967 B2 * | 8/2013 | Shamoto | 280/730.2 |
| 8,596,672 B2 * | 12/2013 | Sugiyama | 280/728.2 |
| 8,636,301 B1 * | 1/2014 | Wang et al. | 280/730.2 |
| 2002/0096863 A1 | 7/2002 | Tanase et al. | |

FOREIGN PATENT DOCUMENTS

| | | | |
|---|---|---|---|
| JP | 2000355261 A | | 12/2000 |
| JP | 2002302005 A | | 10/2002 |
| JP | 2008006895 A | | 1/2008 |
| JP | 2009018718 A | * | 1/2009 |
| JP | 2010069996 A | | 4/2010 |

* cited by examiner

A-A Cross-section

B-B Cross-section

Prior Art

CURTAIN AIRBAG DEVICE FOR VEHICLE

BACKGROUND OF THE INVENTION

1. Field of the Invention

The present invention relates to a vehicle curtain airbag device that is inflated and deployed along a side surface of a vehicle interior for the purpose of protecting occupants in the event of a side crash or a rollover (lateral rollover) of a vehicle.

2. Description of the Related Art

A curtain airbag is provided above a door and is inflated and deployed along a side surface of a vehicle to absorb the load from the head part and the bust of an occupant. The curtain airbag is designed so as to protect (restrain) an occupant mainly in the event of a side crash. For example, pressure duration of the curtain airbag when it is inflated and deployed is longer than that of a front airbag or the like. This is because a side crash can lead to a rollover (lateral rollover) and the time in which an impact can occur may increase. In particular, in the event of a rollover, the danger of an occupant being ejected outside a vehicle through the side window increases. Thus, the curtain airbag restrains the occupant to prevent the occupant from being ejected outside the vehicle by maintaining the inflated state until a rollover finishes.

The curtain airbag is required to be reliably inflated and deployed to a vehicle side surface in order to absorb the load from an occupant and to realize an ejection preventing performance. Therefore, a "head protecting airbag device" disclosed in Japanese Patent Application Publication No. 2002-302005, for example, aims to provide a head protecting airbag device capable of generating high tension along a vehicle front-rear direction in a lower edge side of the airbag upon completion of inflation and deployment, in which when inflation gas is introduced and deployment and inflation of the airbag is completed, tension is generated in the front-rear direction in respective inflation shielding portions by respective inflating portions that are partitioned by partitioning portions in the inflation shielding portions. The inflation shielding portions are connected on the lower edge of the airbag by an inflation communication portion located below a planar portion to which inflation gas is not introduced. The inflation communication portion is disposed in the front-rear direction along the lower edge of the airbag and can connect the inflation shielding portions without decreasing the tension generated in the respective inflation shielding portions. Thus, it is possible to generate high tension in the front-rear direction along the entire lower edge of the airbag.

In recent years, in order to more reliably prevent ejection of occupants outside a vehicle in the event of a rollover, there is a demand for the curtain airbag to have a further improved performance (improvement in ejection preventing performance). To meet this demand, various persons skilled in the art have verified the ejection preventing performance at respective locations on a curtain airbag. At present, it is known that the ejection preventing performance of a curtain airbag tends to be poor on the end side (in particular, near the front end) than near the center in the vehicle front-rear direction. Here, as in the head protecting airbag device disclosed in Japanese Patent Application Publication No. 2002-302005, although the ejection preventing performance can be improved slightly by connecting a front end of the curtain airbag to a front pillar garnish, the improvement effect of that alone is not sufficient.

SUMMARY

The present invention has been made in view of the problems of the conventional art, and an object of the present invention is to provide a vehicle curtain airbag device capable of remarkably improving an ejection preventing performance at an end of a vehicle longitudinal direction and providing an excellent impact absorbing function (cushioning properties) of receiving an occupant in a vehicle interior.

A vehicle curtain airbag device according to the present invention is a vehicle curtain airbag device, an upper end portion of which is supported by being attached to an upper position of a side surface of a vehicle interior, and which is inflated and deployed from an upper side toward a lower side in a curtain form along the side surface in response to introduction of inflation and deployment gas in order to protect an occupant in the vehicle interior, wherein a strap is provided between a non-inflation region that divides an end chamber positioned at an end of a vehicle longitudinal direction from an adjacent central chamber and an end pillar positioned at the end of the vehicle longitudinal direction so as to connect the non-inflation region to the end pillar, on an outer surface of the end chamber, a height position of a first connecting portion that connects one end of the strap to the end pillar is set to be higher than a height position of a second connecting portion that connects the other end of the strap to the non-inflation region, and the strap is set to be shorter than a length between the first connecting portion and a position to which the second connecting portion tries to move according to inflation and deployment if the strap is not present, and is stretched substantially linearly between the first connecting portion and the second connecting portion by the inflated and deployed end chamber.

Preferably, the strap is stretched in an inclined direction in a vehicle height direction between the first connecting portion and the second connecting portion of which the height position is lower than the first connecting portion. Preferably, the second connecting portion of the strap can move up to the same height position as the first connecting portion when the end chamber is pushed from a vehicle interior side toward a vehicle exterior side. Preferably, a height position of the first connecting portion is set to an estimated height position at which an occupant collides with the end chamber.

A vehicle curtain airbag device according to the present invention is a vehicle curtain airbag device, an upper end portion of which is supported by being attached to an upper position of a side surface of a vehicle interior, and which is inflated and deployed from an upper side toward a lower side in a curtain form along the side surface in response to introduction of inflation and deployment gas in order to protect an occupant in the vehicle interior, wherein a strap is provided between a non-inflation region that divides an end chamber positioned at an end of a vehicle longitudinal direction from an adjacent central chamber and an end pillar positioned at the end of the vehicle longitudinal direction so as to connect the non-inflation region to the end pillar with an outer surface of the end chamber, a height position of a first connecting portion that connects one end of the strap to the end pillar is set to be higher than a height position of a second connecting portion that connects the other end of the strap to the non-inflation region, and a length of the strap is set such that the strap is stretched approximately linearly in an inclined direction between the first and second connecting portions by the inflated and deployed end chamber.

In the vehicle curtain airbag device according to the present invention, it is possible to remarkably improve an ejection preventing performance at an end of a vehicle longitudinal direction and to provide an excellent impact absorbing function (cushioning properties) of receiving an occupant in a vehicle interior.

DETAILED DESCRIPTION

Figure 1:
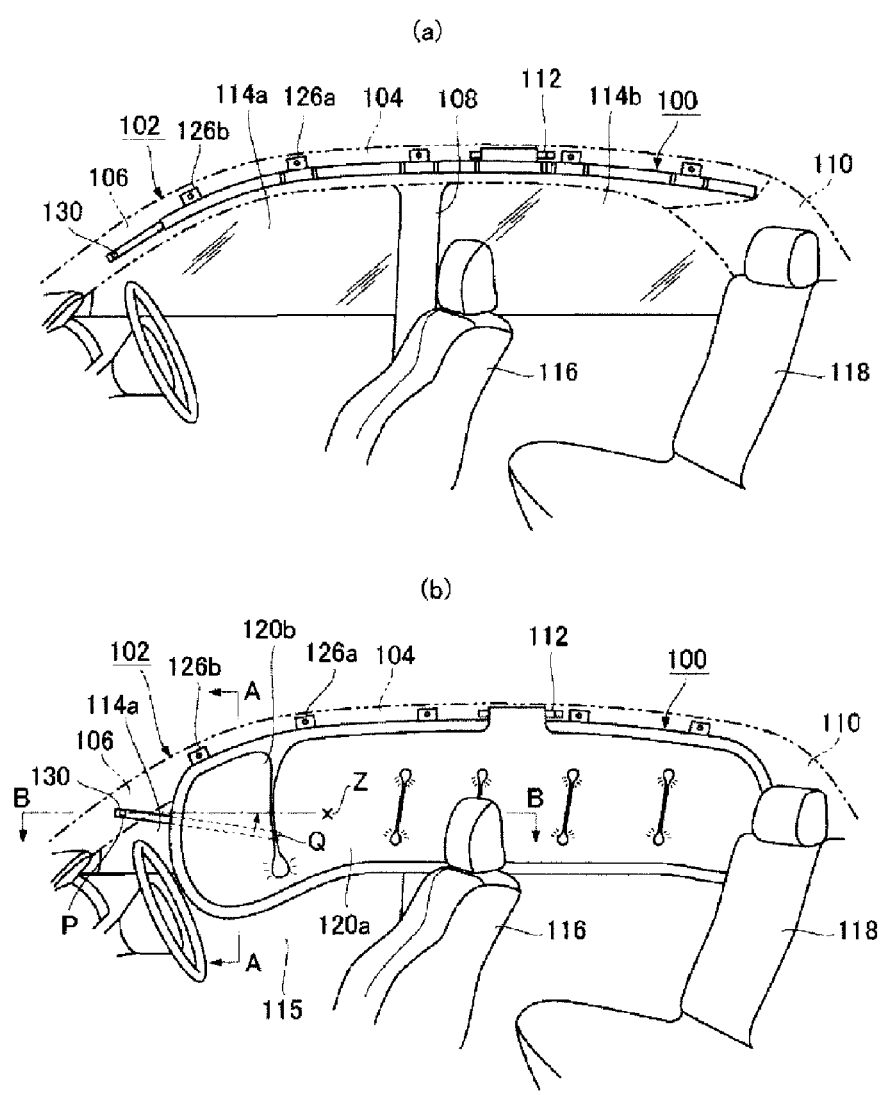
FIGS. 1(a) and 1(b) are diagrams illustrating a preferred embodiment of a vehicle curtain airbag device according to the present invention.

Preferred embodiments of the present invention will be explained next in detail with reference to accompanying drawings. Dimensions, materials, other specific numerical values and the like given in the embodiments are only illustrative in character, for the sake of easier understanding of the invention, and, unless particularly stated otherwise, are not meant to limit the present invention in any way. In the description and the drawings, elements having substantially the same function and configuration are denoted by identical reference numerals, and a recurrent explanation thereof will be omitted. Elements that are not directly related to the present invention are omitted in the drawings.

FIGS. 1(a) and 1(b) are diagrams illustrating a curtain airbag according to an embodiment of the present invention. FIG. 1(a) illustrates a curtain airbag (hereinafter referred to as an "airbag 100") in a non-deployed state and FIG. 1(b) illustrates the airbag 100 in a deployed state. In the following description, although all embodiments are described with reference to a right-side curtain airbag of a vehicle 102 as illustrated in FIGS. 1(a) and 1(b), a left-side curtain airbag has a similar structure that is symmetrical to that of the right-side curtain airbag.

The airbag 100 is attached to and received in a roof side rail 104 (indicated by a virtual line in the figure) above a side surface of a vehicle interior in a rolled state as shown in FIG. 1(a) or in a folded state (not illustrated). In general, the roof side rail 104 is covered by a roof trim and is not visible from the vehicle interior. A plurality of pillars that support the roof is connected to the roof side rail 104. These pillars are called a front pillar 106, a center pillar 108, and a rear pillar 110, in that order from the front side of the vehicle 102. The front pillar 106 and the rear pillar 110 are end pillars that are positioned at ends of a vehicle longitudinal direction.

The curtain airbag 100 is formed in a bag shape by sewing the front and back sides of a base fabric, which constitutes the surface thereof or by weaving using one-piece woven (OPW), for example.

The airbag 100 includes an inflator 112 which is a gas generating device. When a side crash, a rollover (lateral rollover), or the like occurs in the vehicle 102, first, a sensor (not illustrated) included in the vehicle 102 detects an impact and sends an ignition signal to the inflator 112. Then, an explosive in the inflator 112 burns to generate inflation and deployment gas which is introduced into the airbag 100.

When the gas is introduced from the inflator 112, as illustrated in FIG. 1(b), the airbag 100 is inflated and deployed downward in a curtain shape along the side surface (a side window 114a or the like) of the vehicle interior with an upper end being supported by the roof side rail 104 to thereby protect the occupant. According to the airbag 100, it is possible to protect the occupants on a front seat 116 and a rear seat 118 simultaneously.

Figure 2:
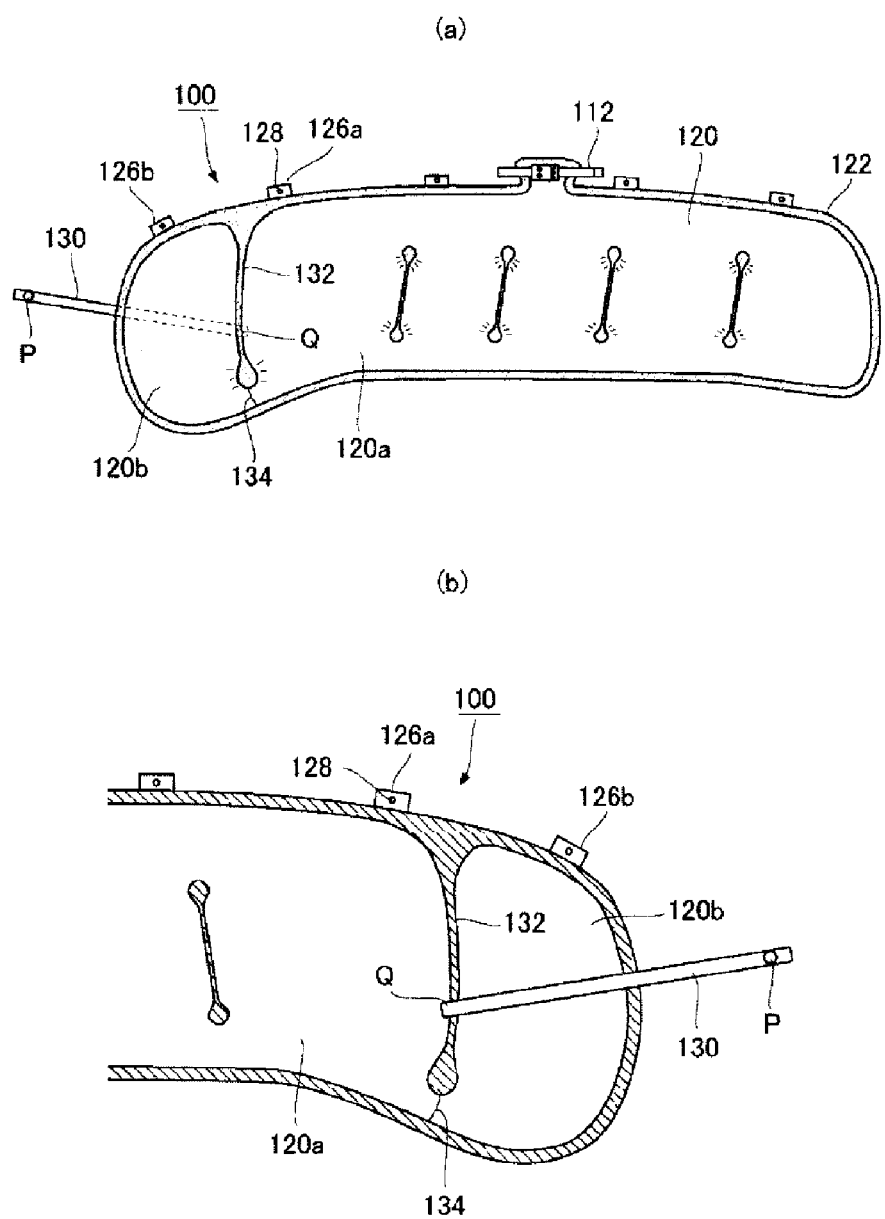
FIGS. 2(a) and 2(b) are diagrams illustrating the curtain airbag in a deployed state of FIGS. 1(a) and 1(b)

FIGS. 2(a) and 2(b) are diagrams illustrating a deployed state of the airbag 100 of FIGS. 1(a) and 1(b). FIG. 2(a) illustrates a cross-section of the airbag 100 when seen from the vehicle interior, and FIG. 2(b) illustrates a portion of the airbag 100 of FIG. 2(a) on the vehicle front side when seen from the vehicle exterior side.

As illustrated in FIG. 2(a), the airbag 100 includes an inflation region 120 that is inflated in the event of a crash or a lateral rollover of the vehicle 102 and a non-inflation region 122 (depicted by hatching in the drawing) that is not inflated and partitions the inflation region 120. The inflation region 120 is partitioned into a plurality of chambers by the non-inflation region 122. The chamber is a portion that makes direct contact with an occupant during emergency such as a crash. Due to the respective chambers, the occupant is protected from crashing into the vehicle side surface or thrusting out of the vehicle.

Among the plurality of chambers, a main chamber 120a is provided slightly on the front side near the center in the vehicle front-rear direction (vehicle longitudinal direction) of the airbag 100. As illustrated in FIG. 1(b), the main chamber 120a is inflated and deployed approximately immediately next to the front seat 116. Since the main chamber 120a is inflated and deployed at the position closest to the occupant on the front seat 116, the occupant having received impact by a normal side crash is protected by the main chamber 120a.

A front chamber 120b is provided on the front side in the vehicle front-rear direction (vehicle longitudinal direction) of the airbag 100 as an end chamber of the present embodiment. As illustrated in FIG. 1(b), the front chamber 120b is inflated and deployed on the front side of the front seat space. The front chamber 120b protects the occupant on the front seat 116, of which the seating attitude greatly collapses in the event of a rollover in particular. The lower edge of the front chamber 120b protrudes further downward than the lower edge of the main chamber 120a or the like on the rear side and overlaps a door portion 115 below the side window 114a. As a result, even when the side window 114a is broken to form an opening, since the lower edge of the front chamber 120b interferes with the door portion 115, the front chamber 120b is prevented from being exposed to the vehicle exterior through the opening.

As illustrated in FIG. 2(a), the front chamber 120b is connected to the main chamber 120a by a gas inflow opening 134. Through the gas inflow opening 134, gas passes from the main chamber 120a toward the front chamber 120b. The non-inflation region 122 includes a seam portion 132 that extends from the upper side of the gas inflow opening 134 to the upper edge of the airbag 100. This seam portion 132 divides the front chamber 120b from the main chamber 120a which is an adjacent central chamber.

The front chamber 120b is supplied with gas from the main chamber 120a through the gas inflow opening 134 only. Therefore, the front chamber 120b starts inflation and deployment later than the main chamber 120a. In other words, the main chamber 120a starts inflation and deployment earlier than the front chamber 120b. Since the main chamber 120a is more likely to make contact with the occupant than the front chamber 120b in the event of a side crash, it is possible to improve an occupant protecting function of the airbag 100.

A plurality of tabs (tabs 126a and 126b) as an attachment member is formed on the upper edge of the airbag 100. The tab is a belt-shaped member used when attaching the airbag 100 to the vehicle 102. The tab (tab 126b) has a bolt hole 128 through which a bolt for fastening to the vehicle 102 passes.

A front strap 130 is provided in the front side of the airbag 100 as a strap of the present embodiment. The front strap 130 is a strap-shaped member that maintains the attitude of the inflated and deployed airbag 100 so as to follow the vehicle side surface. As illustrated in FIG. 1(b), the front strap 130 is connected to the front pillar 106 that is positioned further away from the distal end of the front chamber 120b (that is, the front pillar 106 positioned in front of the front chamber 120b). The front pillar 106 is a portion that protrudes toward the vehicle interior side than the side window 114a (see FIG. 4(a)).

The front strap 130 connects the seam portion 132 to the front pillar 106 via the outer surface (the vehicle exterior side of the airbag 100) of the front chamber 120b. As illustrated in FIG. 2(b), the front strap 130 completely crosses the vehicle exterior surface of the front chamber 120b while extending in the front-rear direction from the front end of the front chamber 120b to the seam portion 132 which is the rear end of the front chamber 120b. Since the front and back sides of the base fabric are integrated in the seam portion 132, it is possible to sufficiently secure the attachment strength of the front strap 130.

Figure 3:
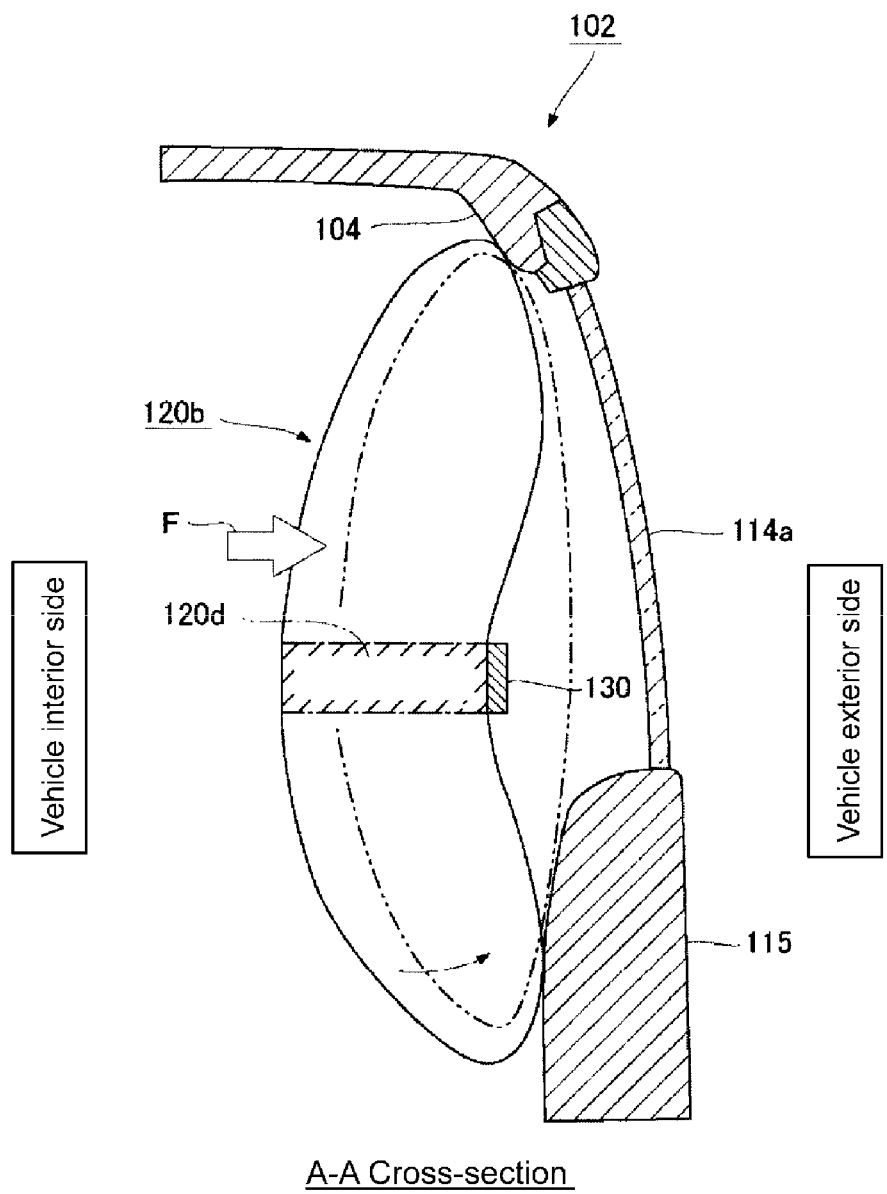
FIG. 3 is a schematic cross-sectional view of FIG. 1(b)

FIG. 3 is a schematic cross-sectional view along line A-A of FIG. 1(b). After inflation and deployment of the airbag 100, the front strap 130 becomes tense between the front pillar 106 that protrudes toward the vehicle interior side more than the side window 114a and the seam portion 132 on the airbag 100 and takes an approximately linear attitude (see FIG. 4(a)). Then, as illustrated in FIG. 3, in at least a region 120d of the front chamber 120b overlapping the front strap 130, the front chamber 120b moves away from the side window 114a in such a manner that the deployment of the front chamber 120b toward the vehicle exterior side is prevented. In most regions other than the region 120d, the front chamber 120b moves away from the side window 114a due to the front strap 130. Due to this, the distance between the front chamber 120b and the occupant on the front side of the front seat space decreases, and the occupant can quickly make contact with the front chamber 120b in the event of a crash.

Figure 4:
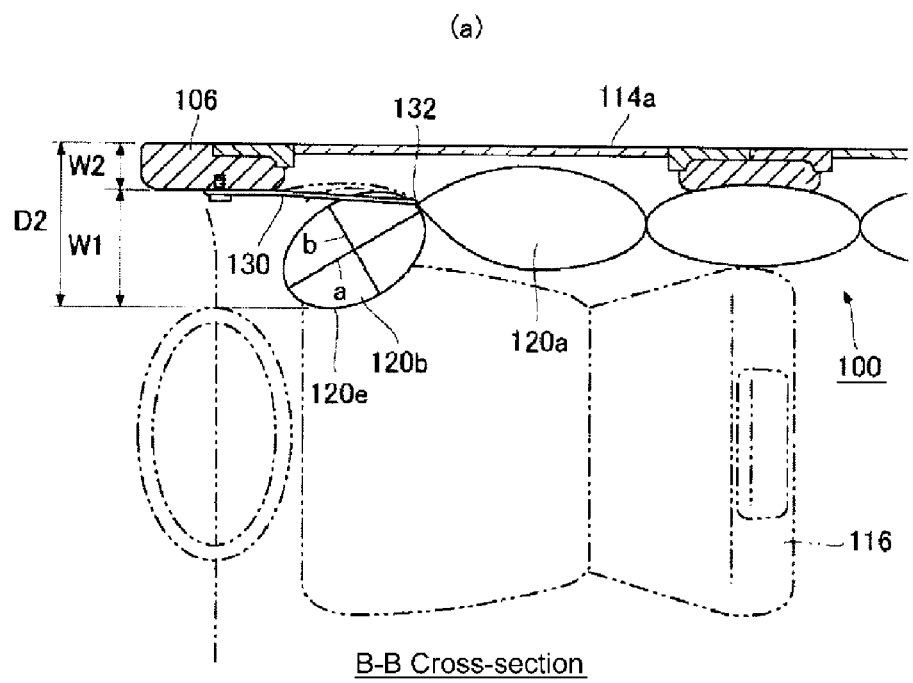
FIGS. 4(a) and 4(b) are diagrams for comparing the curtain airbag according to the present embodiment and a conventional curtain airbag.
Figure 4:
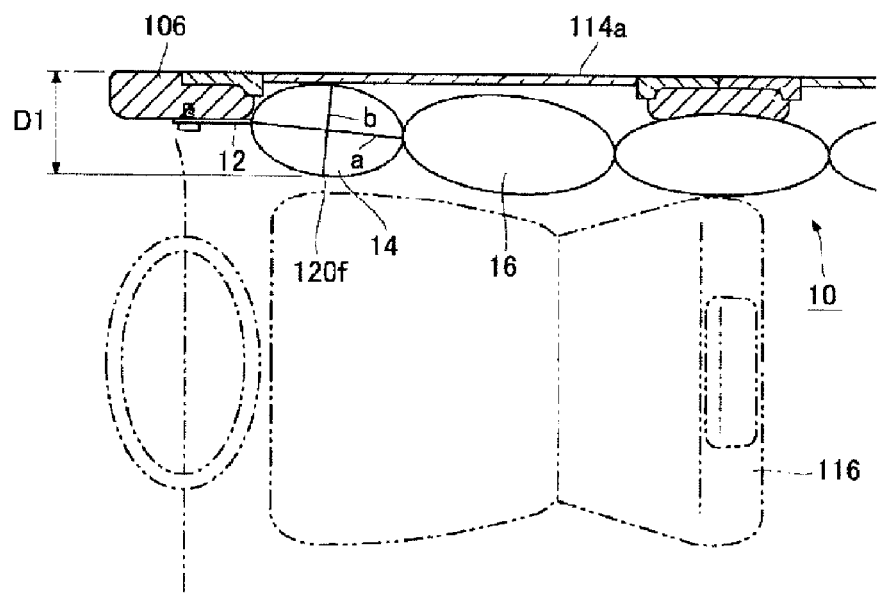

FIGS. 4(a) and 4(b) are diagrams for comparing the vehicle curtain airbag device according to the present embodiment and a conventional curtain airbag. FIG. 4(a) is a diagram illustrating the airbag 100 according to the present embodiment and corresponds to a cross-section along line B-B of FIG. 1(b). FIG. 4(b) is a conventional curtain airbag (hereinafter referred to as an "airbag 10") and illustrates a cross-section corresponding to the airbag 100 of FIG. 4(a).

As illustrated in FIG. 4(b), in the conventional airbag 10, a front strap 12 is attached to a front end of a front chamber 14. After inflation and deployment, the front chamber 14 applies to the front strap 12 tensile force (tension) toward the vehicle rear side, whereby the front strap 12 becomes tense. In this case, the front strap 12, the front chamber 14, and a main chamber 16 take such an attitude that they are arranged approximately in a line along the vehicle side surface (the side window 114a or the like).

Figure 5:
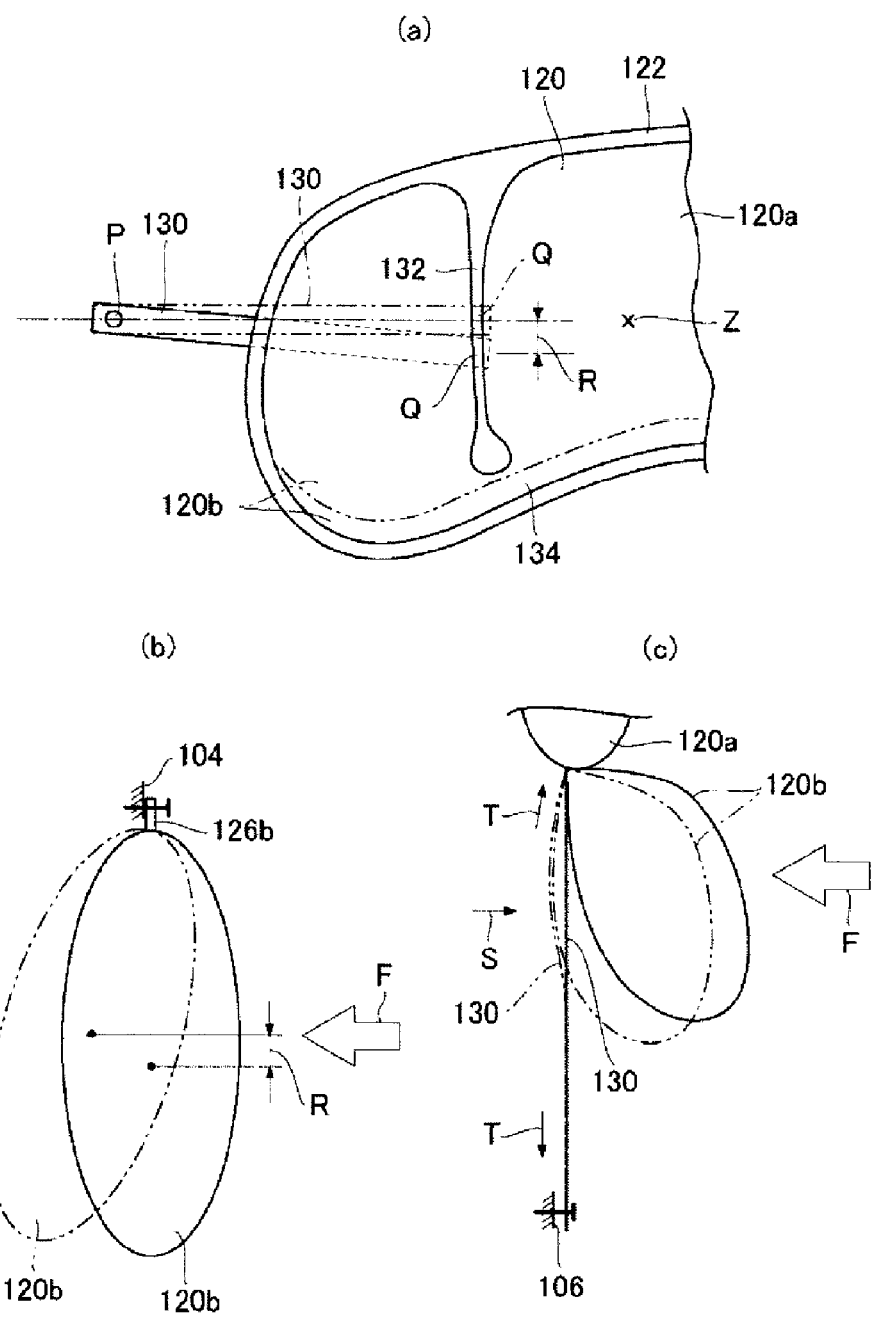
FIGS. 5(a) to 5(c) are diagrams for explaining the effect of the curtain airbag of FIGS. 1(a) and 1(b)

On the other hand, as illustrated in FIG. 4(a), in the airbag 100 according to the present embodiment, the front strap 130 is attached to the seam portion 132 on the rear side of the front chamber 120b. As illustrated in FIG. 5(a), the front strap 130 has one end connected the front pillar 106 at a first connecting portion P and the other end connected to the seam portion 132 at a second connecting portion Q. The length of the front strap 130 is set to be smaller than the length between the first connecting portion P and the position to which the second connecting portion Q tries to move with inflation and deployment if the front strap is not present, and is stretched approximately linearly between the first and second connecting portions P and Q by the inflated and deployed front chamber 120b. Although the behavior of the airbag 100 during deployment is different depending on the dimensions and the attachment position to the roof side rail 104, it is assumed that the seam portion 132 moves toward the rear side from its original position when the airbag 100 is inflated and deployed from a rolled state. In this case, as described above, the length of the front strap 130 is set to be smaller than the length between the attachment position on the front pillar 106 and the position to which the seam portion 132 tries to move with the inflation and deployment of the airbag 100. That is, the length of the front strap 130 is small enough to prevent the seam portion 132 from moving to the target position. Thus, the seam portion 132 is blocked by the front strap 130 that is approximately linearly stretched and cannot actually move up to the position to which the seam portion 132 tries to move. On the other hand, after the inflation and deployment, the front strap 130 becomes tense approximately linearly so as to be pulled toward the rear side by the seam portion 132.

Here, the front pillar 106 attached to the front end of the front strap 130 is a portion (protruding amount≅width W1) that protrudes toward the vehicle interior side more than the side window 114a. Moreover, tension is applied to the front strap 130 toward the vehicle rear side, whereby a region of the front chamber 120b overlapping the front strap 130 moves away from the side window 114a toward the vehicle interior side. Thus, the distance to the occupant on the front seat 116 decreases as compared to the front chamber 14 of the conventional airbag 10, and the occupant can be quickly received.

As described above, in the present embodiment, the attitude of the front chamber 120b or at least a portion (an overlapping region) of the front chamber 120b is changed by attaching the front strap 130 to the seam portion 132. Here, the seam portion 132 is a portion that is not inflated, and as illustrated in FIG. 2(a), is provided so as to extend from the upper edge of the airbag 100 to the gas inflow opening 134 on the lower side. Thus, the front chamber 120b interfering with the front strap 130 can rotate toward the vehicle interior side during the inflation and deployment as if the seam portion 132 is a rotation axis. Due to this rotation, the front chamber 120b can be easily positioned toward the vehicle interior side.

Reference is made again to FIGS. 4(a) and 4(b). A cross-section, in the vehicle front-rear direction illustrated in the drawing, of the front chamber 14 of the conventional airbag 10 illustrated in FIG. 4(b) is approximately an ellipse that has a long axis "a" in the vehicle front-rear direction. Moreover, the front chamber 14 takes an attitude where an occupant (not illustrated) contacts approximately in an axial direction of the short axis "b" of the ellipse (the occupant makes contact with a portion 120f). However, in the airbag 100 illustrated in FIG. 4(a), since the front strap 130 is attached to the seam portion 132, a portion of the front chamber 120b overlapping the front strap 130 takes an attitude where the front end of the long axis "a" faces an obliquely front side of the vehicle interior side. Due to this, the occupant can make contact with a portion 120e of the front chamber 120b having a larger thickness (≅ width W2) than that of the short axis "b" in the axial direction.

Thus, with this configuration, it is possible to more reliably absorb the load from the occupant.

With further reference to FIGS. 4(a) and 4(b), the protruding amounts toward the vehicle interior side, of the front chambers 14 and 120b from the side window 114a as a reference will be compared. In the airbag 10 of FIG. 4(b), when the thickness of the side window 114a is ignored, a protruding amount D1 of the front chamber 14 from the side window 114a to the vehicle interior side is approximately the thickness (length) in the axial direction of the short axis "b" of the front chamber 14. On the other hand, the front chamber 120b of the airbag 100 of FIG. 4(a) is positioned closer to the vehicle interior side than the front strap 130 that is fastened to the front pillar 106. Thus, a protruding amount D2 of the front chamber 120b from the side window 114a to the vehicle interior side is the sum (W1+W2) of a width W1 (width W1 is larger (longer) than the short axis "b") of the front chamber 120b and a width W2 of the front pillar 106. In this way, in the airbag 100 according to the present embodiment, the front chamber 120b protrudes (moves) greatly toward the vehicle interior side as compared to the conventional airbag 10.

Further, a height position of the first connecting portion P that connects one end of the front strap 130 to the front pillar 106 is set to be higher than a height position of the second connecting portion Q that connects the other end of the front strap 130 to the seam portion 132. As described above, the length of the front strap 130 is set to be smaller than the length between the first connecting portion P and the position to which the second connecting portion Q tries to move with inflation and deployment if the front strap is not present, and is stretched approximately linearly between the first and second connecting portions P and Q by the inflated and deployed front chamber 120b. Therefore, in the inflated and deployed state, the front strap 130 is stretched in an inclined direction in the vehicle height direction between the first connecting portion P and the second connecting portion Q of which the height position is lower than the first connecting portion P. Specifically, the front strap 130 is stretched approximately linearly to be inclined downward in the inclined direction between the first connecting portion P and the second connecting portion Q by the inflated and deployed front chamber 120b. That is, the length of the front strap 130 is set to be a predetermined length or smaller so that tension is applied from the inflated and deployed airbag 100 such that the front strap 130 becomes approximately linear. Due to this, the deployment behavior of the airbag 100 is restricted, and the attitude thereof is maintained so as to follow the vehicle side surface. The front strap 130 may be linear before the inflation and deployment starts. The inflated and deployed front chamber 120b has its outer surface supported on the front strap 130 that is stretched in the inclined direction and forms a wall-like cushion. FIG. 5(a) is a side view illustrating an upward movement of the front strap 130, FIG. 5(b) is a front view, and FIG. 5(c) is a plan view. Since the length of the front strap 130 and the height positions of the first and second connecting portions P and Q are set in the above-described manner, when the front chamber 120b is pushed from the vehicle interior toward the vehicle exterior side, the second connecting portion Q of the front strap 130 can move up to the same height position as the first connecting portion P. Specifically, when the front chamber 120b is pushed from the vehicle interior toward the vehicle exterior side (indicated by arrow "F" in the drawing) and a lower portion thereof rotates toward the vehicle exterior side about the tab 126b, the front strap 130 protrudes toward the vehicle exterior side while receiving tensile force T with the first connecting portion P restrained by the front pillar 106. In this case, the front strap 130 allows the front chamber 120b to move toward the vehicle exterior side up to an extent (upward movement amount R) that the second connecting portion Q of the seam portion 132 moving with the rotation of the front chamber 120b is at the same height position as the first connecting portion P. When the pressing force F decreases, the front strap 130 pushes the front chamber 120b back toward the vehicle interior with the tensile force T generated therein (this pushing is indicated by arrow S in the drawing). Due to this, when the occupant on the front seat 116 collides with the front chamber 120b, it is possible to allow slight rotation of the front chamber 120b while restricting the exposure of the front chamber 120b toward the vehicle exterior side so that an impact absorbing function (cushioning properties) of receiving an occupant in the vehicle interior can be obtained satisfactorily.

The height position of the first connecting portion P is set to an estimated height position Z at which the occupant collides with the front chamber 120b. Due to this, it is possible to cause the front strap 130 to function by taking advantage of the pressing force F resulting from the collision.

As described above, since the airbag 100 has the front chamber 120b disposed close to the occupant on the front seat 116, it is possible to decrease the movement amount from the seating position of the occupant upon receiving an impact. Thus, this airbag 100 can improve the performance of preventing an occupant on the front seat 116 from being ejected outside the vehicle in the event of a rollover. Further, since the front strap 130 is disposed obliquely along the vehicle height direction as described above, it is possible to allow the upward movement in the vehicle height direction of the front chamber 120b that receives the occupant up to a position where the front strap 130 becomes horizontal to restrict the front chamber 120b at the horizontal position and to appropriately secure the performance of preventing the occupant from being ejected outside the vehicle while improving the cushioning properties of the airbag 100.

Figure 6:
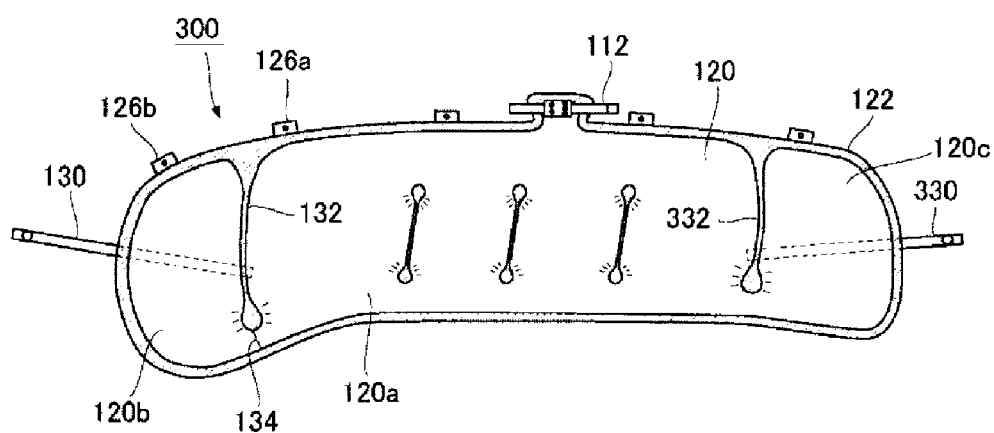
FIG. 6 is a diagram illustrating a modification of the vehicle curtain airbag device according to the present invention.
Figure 7:
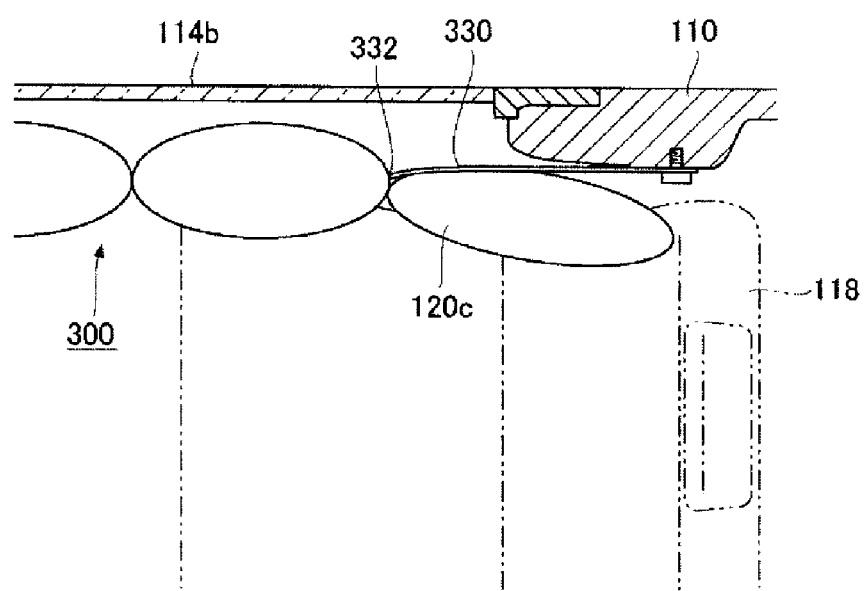
FIG. 7 is a diagram illustrating a state after the curtain airbag of FIG. 6 is inflated and deployed in the vehicle interior.

FIG. 6 is a diagram illustrating a modification of an airbag according to the present embodiment. FIG. 7 corresponds to FIG. 6. As illustrated in FIG. 7, an airbag 300 includes a rear chamber 120c provided on the rear side in the vehicle front-rear direction (vehicle longitudinal direction) of the airbag 300 as one of a plurality of chambers and as an end chamber different from the front chamber 120b. Moreover, a rear strap 330 is provided on the rear side of the airbag 300 as a strap different from the front strap 130. The rear strap 330 is a strap-shaped member that maintains the attitude of the inflated and deployed airbag 300 so as to follow the vehicle side surface similarly to the front strap 130. The rear strap 330 is connected to a rear pillar 110 (see FIG. 1(a)) which is an end pillar disposed closer to the rear side than the airbag 300. The rear pillar 110 is a portion that protrudes toward the vehicle interior side more than the side window 114b (see FIG. 7).

The rear strap 330 is sewn to a front region that is on the vehicle exterior side of the airbag 300 and is anterior to the rear end of the rear chamber 120c. As illustrated in FIG. 6, the rear strap 330 of the airbag 300 is sewn to a seam portion 332 that divides the rear chamber 120c from an adjacent central chamber (that is, the main chamber 120a).

FIG. 7 is a diagram illustrating a state after the curtain airbag of FIG. 6 is inflated and deployed in the vehicle interior. FIG. 7 corresponds to FIG. 4(a). The rear strap 330 of the modification has the same configuration and performs the same function as the front strap 130. That is, as illustrated in FIG. 7, after inflation and deployment of the airbag 300, the rear strap 330 takes an approximately linear attitude by receiving tension from the airbag 300. Then, in at least a region of the rear chamber 120c overlapping the rear strap 330, the rear chamber 120c is moved toward the vehicle interior side further away from the side window 114b and is inflated and deployed further toward the vehicle interior side.

In the above configuration, the rear strap 330 acts similarly to the front strap 130, whereby the distance between the rear chamber 120c and the occupant on the rear side of a rear seat space decreases, and the occupant can quickly make contact with the rear chamber 120c. In particular, by providing the rear chamber 120c at a position close to the occupant, it is possible to decrease the movement amount from the seating position of the occupant upon receiving an impact. Thus, it is possible to improve the performance of preventing the occupant on the rear seat 118 from being ejected outside the vehicle in the event of a rollover. Moreover, since the rear strap 330 is disposed obliquely along the vehicle height direction as described above, it is possible to allow the movement of the rear chamber 120c that receives the occupant up to a position where the rear strap 330 becomes horizontal to restrict the rear chamber 120c at the horizontal position and to appropriately secure the performance of preventing the occupant from being ejected outside the vehicle while improving the cushioning properties of the airbag 100.

Preferred embodiments of the present invention have been described above with reference to accompanying drawings, but the described embodiments are preferable examples, and the invention may be embodied and implemented in other ways, in accordance with various methods. Unless specifically indicated in the description of the present application, the invention is not restricted by the shape, size, configurational arrangement and so forth of the detailed parts depicted in the drawings. Furthermore, the expressions and terms used in the description of the present application are explanatory in purpose, and are not meant to be limiting in any way, unless restricting subject matter to that effect is specifically set forth in the description.

Therefore, a person skilled in the art can devise various alterations or modifications within the scope as set forth in the claims, and it is to be understood that these alterations and modifications belong, as a matter of course, to the technical scope of the present invention.

In the embodiments, examples have been described wherein the vehicle curtain airbag device according to the present invention is used in an automobile, but the present invention can be used, besides automobiles, also in aircraft and ships, to elicit similar effects.

The present invention can be used for a vehicle curtain airbag device that is inflated and deployed along a side surface of a vehicle interior for the purpose of protecting occupants in the event of a side crash or a rollover (lateral rollover) of a vehicle.

What is claimed is:

1. A vehicle curtain airbag device for a vehicle having a vehicle interior defined by an end pillar at one end of the vehicle in a longitudinal direction and an upper portion extending along a side surface of the vehicle interior, the vehicle curtain airbag device comprising:

an airbag having an upper end portion attached to the upper portion and extending along the side surface of the vehicle interior, and which is inflated and deployed from the upper portion toward a lower side in a curtain form along the side surface of the vehicle interior in response to introduction of inflation and deployment gas into the airbag in order to protect an occupant in the vehicle interior, the airbag having a central chamber adjacent to an end chamber that is positioned at one end of the vehicle, a non-inflation region dividing the end chamber from the central chamber, a strap being provided between the non-inflation region and the end pillar so as to connect the non-inflation region to the end pillar, the strap being located along an outer surface of the end chamber, in a deployed state of the airbag, a first connecting portion connecting one end of the strap to the end pillar at a first height position that is higher than a second height position of a second connecting portion connecting another end of the strap to the non-inflation region, and in the deployed state of the airbag, the strap being stretched substantially linearly between the first connecting portion and the second connecting portion, the strap having a length between the first connecting portion and the second connecting portion that restricts and stops movement of the second connecting portion in a direction toward a rear end of the vehicle at a restricted position, the restricted position being located closer to the first connecting portion than an unrestricted position of the second connecting portion achieved in the deployed state absent the strap.

2. The vehicle curtain airbag device according to claim 1, wherein, in the deployed state of the airbag, the strap has an inclined orientation between the first connecting portion and the second connecting portion, the second connecting portion having the second height position that is lower than the first height position of the first connecting portion.

3. The vehicle curtain airbag device according to claim 1, wherein the second connecting portion of the strap is configured to move from the second height position to a third height position when the end chamber is moved toward an exterior side of the vehicle, the third height position being generally the same as the first height position of the first connecting portion.

4. A vehicle curtain airbag device in a vehicle having a vehicle interior defined by an end pillar at one end of the vehicle in a longitudinal direction and an upper portion extending along a side surface of the vehicle interior, the vehicle curtain airbag device comprising:

an airbag having an upper end portion attached to an upper position of the side surface of the vehicle interior, when inflated the airbag being deployed from an upper side toward a lower side of the vehicle interior in a curtain form along the side surface and in response to introduction of inflation and deployment gas in order to protect an occupant in the vehicle interior, the airbag having a non-inflation region dividing an end chamber from a central chamber, the end chamber being positioned toward the one end of the vehicle, a strap extending between the non-inflation region and the end pillar positioned at the one end of the vehicle interior, the strap extending between the end pillar and the non-inflation region and extending along an outer surface of the end chamber, a first connecting portion connecting one end of the strap to the end pillar at a first height, a second connecting portion connecting the other end of the strap to the non-inflation region at a second height, the first height being greater than the second height relative to the vehicle, and the strap having a length such that the strap is stretched approximately linearly and in an inclined orientation between the first and second connecting portions when the end chamber is inflated and deployed.

5. The vehicle curtain airbag device of claim 4, wherein the end chamber is biased inwardly toward the vehicle interior by the strap when the airbag is in the deployed and inflated state.

6. The vehicle curtain airbag device of claim 4, wherein end chamber is biased by the strap out of alignment with the central chamber and the end pillar and inwardly toward the vehicle interior.

7. The vehicle curtain airbag device of claim 4, wherein the strap extends toward a front end of the vehicle.

8. The vehicle curtain airbag device of claim 4, wherein the strap extends toward a rear end of the vehicle.

9. The vehicle curtain airbag device of claim 4, comprising two of the straps, one of the straps extending toward a front end of the vehicle and the other of the straps extending toward a rear end of the vehicle.

10. The vehicle curtain airbag device of claim 4, wherein the strap is attached to an exterior surface of the end chamber.

\* \* \* \* \*